United States Patent [19]

Inada et al.

[11] Patent Number: 4,571,945
[45] Date of Patent: Feb. 25, 1986

[54] TURBOCHARGER CONTROL DEVICE WITH OPTICAL TURBOCHARGER SHAFT SPEED SENSING

[75] Inventors: Masami Inada, Kariya; Yasuhiro Kawabata, Anjo; Motonobu Akagi, Kariya, all of Japan

[73] Assignee: Aisin Seiki Kabushiki Kaisha, Japan

[21] Appl. No.: 653,584

[22] Filed: Sep. 24, 1984

Related U.S. Application Data

[63] Continuation of Ser. No. 393,867, Jun. 30, 1982, abandoned.

[30] Foreign Application Priority Data

Jul. 1, 1981 [JP] Japan ............................. 56-103848

[51] Int. Cl.$^4$ ............................................. F02B 37/12
[52] U.S. Cl. ........................................ 60/602; 415/36; 417/42; 417/47; 324/175
[58] Field of Search .................. 60/600, 601, 602, 603, 60/611; 324/175; 415/30, 36; 417/42, 47

[56] References Cited

U.S. PATENT DOCUMENTS 4,089,173  5/1978  Melchior et al. ..................... 60/606
4,120,156  10/1978  McInerney ............................ 60/602
4,204,115  5/1980  Boldridge ......................... 324/175 X

FOREIGN PATENT DOCUMENTS 231156  9/1926  United Kingdom .................. 60/602

OTHER PUBLICATIONS

IBM Technical Disclosure Bulletin, vol. 17, No. 11, Apr. 1975, Two Pulse Per Revolution Digital Tachometer, Holdaway et al.
PCT Publication No. WO80/02585, Osborn, published Nov. 27, 1980.

Primary Examiner—Michael Koczo
Attorney, Agent, or Firm—Finnegan, Henderson, Farabow, Garrett & Dunner

[57] ABSTRACT

A turbocharger control device for use in conjunction with an internal combustion engine includes a turbine driven by exhaust gases; a compressor connected with the turbine by having a shaft having a hole through the diameter; a photo projector and photo receiver facing each other across the shaft at the location of the through-hole for generating a light pulse signal proportional to the rate of rotation of the shaft; a photo-voltage converter connected optically with the photo receiver for converting the light pulse signal to an electrical pulse signal; an engine control unit connected electrically with the converter for generating a control signal in response to the electrical signal; an actuator connected with the engine control unit for movement in response to the control signal; an exhaust gas bypass passage connected between upstream and downstream portions of the turbine; and a bypass valve operatively connected to the actuator and associated with the bypass passage for controlling the flow through the bypass passage in response to the control signal.

4 Claims, 3 Drawing Figures

U.S. Patent   Feb. 25, 1986   4,571,945
FIG. 1.
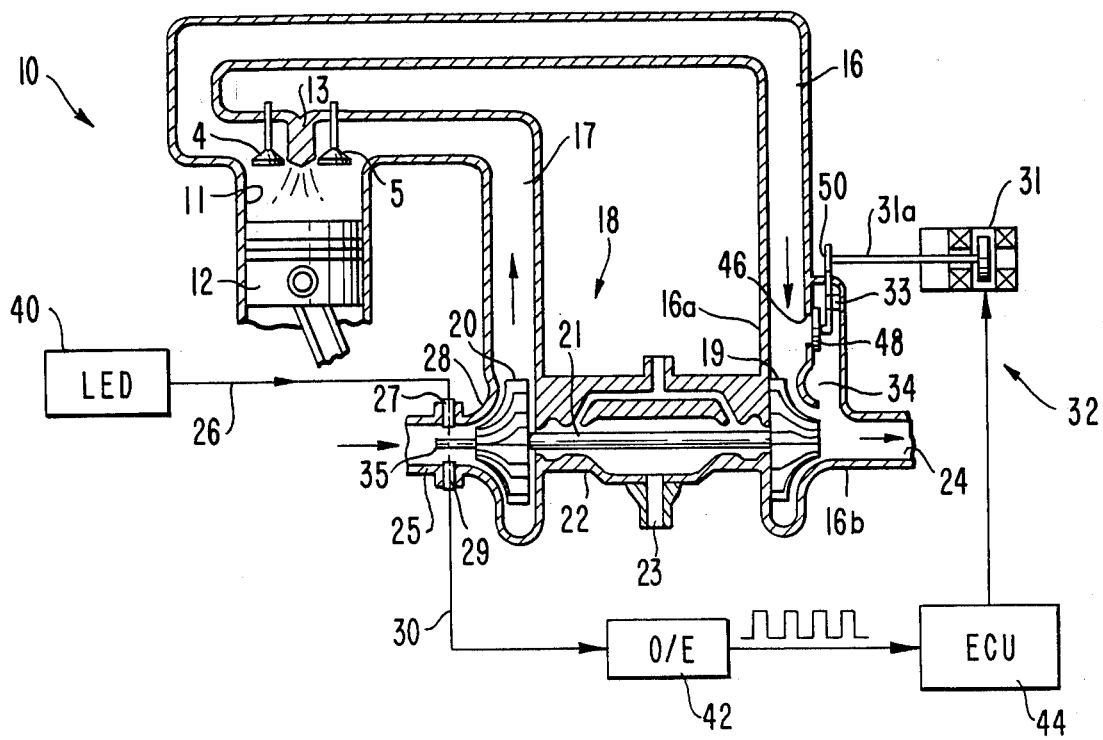
FIG. 2.
FIG. 3.
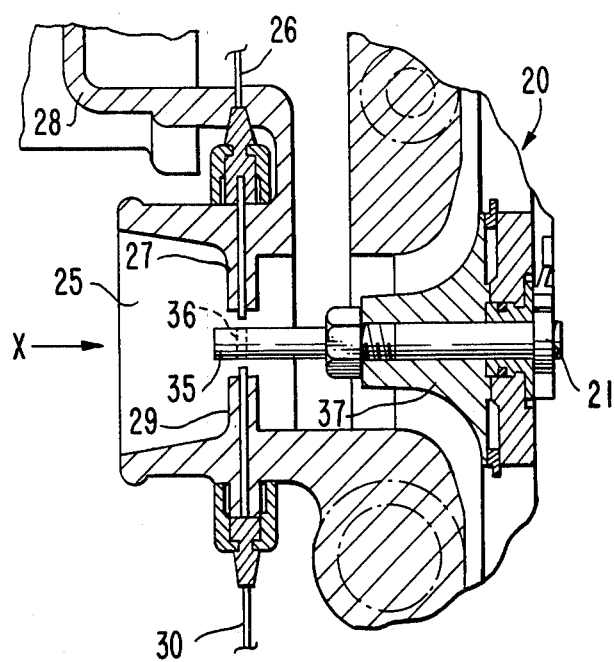

TURBOCHARGER CONTROL DEVICE WITH OPTICAL TURBOCHARGER SHAFT SPEED SENSING

This is a continuation of application Ser. No. 393,867 filed June 30, 1982, abandoned.

BACKGROUND OF THE INVENTION

1. Field of the Invention

This invention relates generally to control devices for turbochargers, and more particularly to an improved turbocharger control device for use in conjunction with internal combustion engines.

2. Prior Art of the Invention

Turbochargers generally are installed in engines for improving the output power of the engine by increasing the air flow charge to the cylinders to support an increased fuel charge. Because the power delivered by the engine can be drastically increased if the air flow to the engine is increased excessively, it is necessary to prevent the increased output power from exceeding a critical level and having a detrimental influence on the integrity of the engine. In order to prevent this influence, there has been proposed a control system which operates to prevent the air charge from exceeding a safe level in view of the characteristics of the engine.

The above-mentioned conventional control system which is self-regulating detects the pressure of the air flow charge supplied to an engine intake manifold by the compressor component of a turbocharger, utilizes this air flow pressure to operate a control device which, in turn, controls the exhaust gas flow to the turbine component using a servomechanism.

Because the above-mentioned conventional control system senses the pressure of the air flow supplied from the compressor and operates the control device by means of detecting the air flow pressure, the turbine and compressor can reach an unacceptably high speed of rotation before the control device can operate to reduce exhaust gas flow to the turbine. This "overspeed" condition can result in increases in the air flow pressure over the maximum permissible levels before the compressor shaft speed can be slowed, especially during rapid increases in engine power. In order to compensate for compressor overspeed, the upper limit of the air flow pressure is conventionally set in a pressure range which is low relative to the maximum steady state air flow pressure capacity of the engine. Accordingly, it is difficult to make full use of the ability of the turbocharger with such conventional control systems and devices.

Furthermore, because the turbine rotates at comparatively high speeds and experiences high stress levels even at a time when its thermal environment (temperature of exhaust gases) corresponds to normal engine conditions, it is especially important that the rotation of the turbine not be inadvertently or unnecessarily increased under the harmful thermal environment caused by the higher temperatures of the exhaust gases at high power conditions, in order to maintain the strength and integrity of the turbine component of the turbocharger. Also, the construction of the control device should be relatively simple and compact. And, the control device should be constructed using components which retain strength and durability under the thermal environment caused by hot exhaust gases, so that the control device may operate precisely and exactly.

SUMMARY OF THE INVENTION

It is, accordingly, an on object of this invention to eliminate the disadvantages of the above-mentioned control system and device for turbochargers.

It is another object of this invention to provide a turbocharger control device which provides a more direct control of the compressor speed than the above-mentioned control system and also satisfies the above-mentioned necessary and desireable conditions.

In accordance with the invention, and embodied and broadly claimed herein, the turbocharger control device for use in conjunction with an internal combustion engine comprises a turbine operatively connected to an exhaust manifold of the engine to be driven to rotate by exhaust gases; a centrifugal compressor; a shaft connecting the compressor for rotation with the turbine; means for optically sensing the rate of rotation of the shaft; converter means operatively connected to the optical sensing means for supplying an electrical signal corresponding to the rate of rotation of the shaft; control means connected electrically to the converter for generating a control signal in response to the electrical signal; an actuator operatively connected to the control means for movement in response to the control signal; an exhaust gas bypass passage connected between an exhaust manifold portion located upstream of the turbine and an exhaust manifold portion located downstream of the turbine; and valve means operatively connected to the actuator and positioned in the exhaust gas bypass passage for controlling the flow of exhaust gas in the passage in response to the control signal.

It is preferred that the optical sensing means includes photo projecting means and photo receiving means positioned adjacent the shaft, and that the converter means includes a photo-voltage converter optically connected to the photo receiving means.

It is further preferred that the optical sensing means includes a source of light positioned distant from the photo projecting means and wherein the photo projecting means is connected with the light source by optical fiber means.

It is still further preferred that the photo projecting means and the photo receiving means are positioned at diametrically opposed locations across the shaft and facing one another, and that the shaft is provided with a diametrically penetrating hole, an intermittent light pulse signal being received by the photo receiving means during rotation of the shaft.

And it is finally preferred that the exhaust gas bypass passage is flow connected to the upstream manifold portion through an orifice; and that the valve means includes a valve stem pivotably mounted on a fulcrum, a valve plate positioned adjacent the opening and attached to the stem, the actuator being operatively connected to the stem, and the valve plate acting to control exhaust gas flow through the orifice by opening and closing in response to movement of the actuator.

BRIEF DESCRIPTION OF THE DRAWING

Further objects and advantages of the present invention will become apparent from the following detailed description of a preferred embodiment of the present invention, taken together with the accompanying drawing in which:

FIG. 1 is a schematic diagram of a turbocharger system incorporating a control device in accordance with the present invention;

FIG. 2 is an enlarged sectional view of the control device shown in FIG. 1; and

FIG. 3 is a view in the direction of the arrow X in FIG. 2.

DESCRIPTION OF THE PREFERRED EMBODIMENT

Referring now to FIG. 1, there is illustrated an internal combustion engine designated generally by the numeral 10 which includes cylinder 11 within which a piston 12 reciprocates; intake manifold 17 through which air is received into the cylinder 11; and exhaust manifold 16 through which exhaust gases are removed from cylinder 11. Fuel injection nozzle 13 injects fuel into cylinder 11, and valve assemblies 4, 5 control the flow of the air and the exhaust gases into and out of cylinder 11, respectively. Engine 10 is of the type with which the present invention is intended to be used advantageously.

In accordance with the present invention, there is provided a turbocharger control device which includes a turbocharger having a turbine operatively connected to an exhaust gas manifold, a centrifugal compressor, and a shaft connecting the turbine and compressor for dependent rotation. As embodied herein, and with continued reference to FIG. 1, turbocharger 18 includes turbine 19 and centrifugal compressor 20 which are connected to each other by means of shaft 21. Shaft bearing system 22 is provided with lubrication passage 23, both being conventional. In FIG. 2, impeller 37 of the compressor 20 is shown.

Turbine 19 is positioned within exhaust manifold 16 as shown in FIG. 1 so that it may be driven to rotate by the exhaust gas flowing in exhaust manifold 16 (shown by the arrow) and not bypassed by means to be described hereinafter. The exhaust gases are released from exhaust manifold 16 through exhaust gas outlet 24. Compressor 20 including impeller 37 is located within intake manifold 17 so that, as it is driven to rotate by the turbine 19, it will increase air mass flow rate in the direction shown by the arrow in intake manifold 17, and produce the desired increase in pressure and thus density of the air flow charge which is delivered to cylinder 11 of engine 10. The uncompressed air is admitted to intake manifold 17 through inlet 25.

In accordance with the present invention, means are provided for optically sensing the rate of rotation of the shaft connecting the compressor and turbine. As embodied herein, and as best seen in FIGS. 2 and 3, the optical sensing means includes casing member 28 of compressor 20 having a photo (light) projecting portion 27 and a photo (light) receiving portion 29 positioned at diametrically opposite sides of shaft 21 which is supported by casing member 28. Light source 40 (labeled LED in the drawing), such as a photodiode, is connected with photo projecting portion 27 via optical fiber 26, shown by a solid line, to provide light to illuminate shaft 21.

As further embodied herein, shaft 21 is provided with through-hole 36 in its left-end portion 35 at the axial location of photo projecting portion 27 and photo receiving portion 29 of casing member 28. As shaft 21 rotates, an intermittent light pulse is received at photo receiving portion 29, the light pulse frequency being twice the rate of rotation of shaft 21, thereby providing a light pulse signal directly porportional to the speed of the shaft.

In accordance with the present invention, converter means operatively connected to the optical sensing means are provided for generating an electrical signal corresponding to the rate of rotation of the compressor-turbine shaft. As embodied herein, and as shown in FIG. 1 photo-voltage converter 42 (labeled O/E in the drawing) is provided. Photo receiving portion 29 of casing member 28 is connected to O/E converter 42 by means of optical fiber 30. O/E converter 42 acts to convert the light pulse signal received at photo receiving portion 29 into a pulsed voltage (electrical) signal.

Further in accordance with the present invention, control means are provided for generating a control signal in response to the electrical signal generated by the converter means. As embodied herein, engine control unit 44 performs this function by supplying a feedback controlled amount of power in response to an electrical input signal. O/E converter 42 is electrically connected to engine control unit 44 (hereinafter called ECU) as shown by a solid line in FIG. 1, and provides as an input to ECU 44 the pulsed electrical signal as shown in the drawing. ECU 44 can be, for example, a preprogrammed microprocessor or similar device for responding to the input pulse signal from O/E converter 42 and generating a control signal output appropriate to the speed conditions of shaft 21 and the performance characteristics of the exhaust gas flow control components of the present invention, to be discussed henceforth. Given the present disclosure, one of ordinary skill in the art would be able to select and/or assemble components for ECU 44 to achieve the stated function.

Further in accordance with the present invention, an actuator is provided to be operatively connected to the control means to generate movement in response to the control signal. As embodied herein, step motor 31 is used to provide linear motion of motor arm 31a in response to an electrical control signal, for reasons that will become apparent from the succeeding discussion of the bypass valve component of the present invention, but other types of actuators can be used such as step motors producing rotary motion for use with appropriate valve components. ECU 44 is electrically connected with step motor actuator 31 as shown by a solid line.

Still further in accordance with the present invention, an exhaust gas bypass passage is provided to be connected between a portion of the exhaust manifold upstream of the turbine and an exhaust manifold portion downstream of the turbine. As embodied herein, with reference to FIG. 1, bypass passage 34 is connected through orifice 46 to exhaust manifold 16 at a point 16a upstream of turbine 19. Bypass passage 34 also is connected to exhaust manifold 16 at point 16b downstream of turbine 19.

And still further in accordance with the present invention, valve means operatively connected to the actuator and positioned in the exhaust gas bypass passage are provided for controlling the flow of gas in the passage in response to the control signal from the control means. As embodied herein bypass valve 32, which includes valve plate 48 positioned to obturate hole 46 in exhaust manifold 16, valve stem 50 to which valve plate 48 is attached, and valve stem fulcrum 33, is provided for the control of exhaust gas flow in bypass passage 34. Motor arm 31a of actuator 31 is connected with stem 50 of bypass valve 32 as shown in the drawing, and controls the flow area of the bypass valve 32 in the following manner. Valve stem 50 moves pivotally on fulcrum 33 so that movement of motor are 31a controls the opening and the closing of orifice 46 by valve plate 48. Thus, flow through bypass passage 34 is controlled in response to the control signal received by actuator 31 from ECU 44.

In operation, the amount of the exhaust gases flowing through bypass passage 34, namely, the amount of the exhaust gases not delivered to turbine 19, is changeable in response to the flow area of bypass valve 32, thereby controlling the rate of rotation of turbine 19 and necessarily the rate of rotation of compressor 20, thus controlling the pressure and density of the air flow charge which is delivered to cylinder 11 of engine 10. It may be recalled that because left end portion 35 of shaft 21 is intermediate between photo projecting portion 27 and photo receiving portion 29, and is provided with a penetrating hole 36 shown in FIG. 2, a photo signal, namely, an intermittent light pulse signal which has twice the number of pulses as rotations of shaft 21, is generated at photo receiving portion 29 by means of the rotation of shaft 21. This light pulse signal is transmitted to O/E converter 42 by means of optical fiber 30, and then the electrical pulse signal shown in the drawing is transmitted from O/E converter 42 to ECU 44. ECU 44 controls by feedback the output power transmitted to actuator 31 so that the output from ECU 44 controls the exhaust gas bypass amount, in order to rotate turbine 19 and compressor 20 at a predetermined rate which is lower than the rate that would produce a dangerously high air flow charge pressure.

Accordingly, because the turbine 19 has comparatively no influence on the exhaust gas flow rate in the exhaust manifold 16, relative to the influence of compressor 20 on the flow in intake manifold 17, and because the amount of exhaust gas reaching the turbine can be controllably varied by the present invention, the rate of rotation of turbine 19 can be predetermined and also made stable. Therefore, it is possible to maintain the integrity of turbine 19 which rotates at a high speed in a high temperature environment and to prevent excessive pressures in the air flow charge delivered to cylinder 11 of engine 10, preventing a potentially harmful influence on the overall integrity and durability of the engine.

It will be apparent to those skilled in the art that various modifications and variations could be made in the turbocharger control device of the present invention without departing from the scope or spirit of the invention.

What is claimed is:

1. Turbocharger control device for use in conjunction with an internal combustion engine, comprising:
   a turbine operatively connected to an exhaust manifold of the engine to be driven to rotate by exhaust gases;
   a centrifugal compressor;
   a shaft connecting said compressor for rotation with said turbine;
   a casing surrounding, in part, said compressor and said shaft;
   photo projecting means positioned adjacent to said shaft within said casing;
   photo receiving means positioned diametrically opposite said photo projecting means on the opposite side and adjacent to said shaft within said casing;
   said shaft being provided with a diametrically penetrating hole;
   light source means;
   first means for coupling said light source means and said photo projecting means in respect to the transmission of light and for isolating said light source means from said casing in respect to the transmission of vibration and heat, said first coupling means including said light source means being positioned distant from said casing and first optical fiber means connecting said light source with said photo projecting means such that an intermittent light pulse signal is transmitted through the shaft hole to said photo receiving means during rotation of said shaft;
   converter means, including a photo-voltage converter; second means for coupling said converter means and said photo receiving means in respect to the transmission of light and for isolating said photo-voltage converter from said casing in respect to the transmission of vibration and heat, said second coupling and isolating means including said photo-voltage converter being positioned distant from said casing and second optical fiber means connecting said photo receiving means with said photo-voltage converter;
   said photo-voltage converter generating an electrical signal in response to light pulse signals transmitted from said photo receiving means;
   control means connected electrically to said converter means for generating a control signal in response to said electrical signal;
   an actuator operatively connected to said control means for movement in response to said control signal;
   an exhaust gas bypass passage connected between an exhaust manifold portion located upstream of said turbine and an exhaust manifold portion located downstream of said turbine; and
   valve means operatively connected to said actuator and positioned in said exhaust gas bypass passage for controlling flow of exhaust gas in said passage in response to said control signal.

2. Turbocharger control device as set forth in claim 1, wherein said electrical signal transmitted from said converter to said engine control unit is a pulse signal.

3. Turbocharger control device as set forth in claim 1, wherein said exhaust gas bypass passage is flow connected to the upstream manifold portion through an orifice; and wherein said valve means includes a valve stem pivotably mounted on a fulcrum, and a valve plate positioned adjacent said orifice and attached to said stem, said actuator being operatively connected to said stem, said valve plate acting to control exhaust gas flow through said orifice by opening and closing in response to movement of said actuator.

4. Turbocharger control device as set forth in claim 1 wherein said valve means includes a valve plate and a pivotably mounted valve stem connected thereto, and wherein said actuator is a step motor responsive to said control signal for actuating said valve stem and positioning said valve plate in response to said control signal.

* * * * *